US 6,674,692 B1

United States Patent
Holland

(10) Patent No.: US 6,674,692 B1
(45) Date of Patent: Jan. 6, 2004

(54) AUDIO COMPONENT WITH INTEGRATED DIGITAL RECORDING AND STORAGE MEDIA

(76) Inventor: Darren Holland, 711 E. Grand #6, El Segundo, CA (US) 90245

(*) Notice: Subject to any disclaimer, the term of this patent is extended or adjusted under 35 U.S.C. 154(b) by 0 days.

(21) Appl. No.: 09/175,517

(22) Filed: Oct. 20, 1998

(51) Int. Cl.$^7$ ............................................ H04H 9/00
(52) U.S. Cl. ............................................ 369/7; 369/83
(58) Field of Search ................... 369/21, 7, 13, 369/6, 1, 84, 85, 83; 360/5–7, 13, 15

(56) References Cited

U.S. PATENT DOCUMENTS

| | | | |
|---|---|---|---|
| 5,291,462 A | * 3/1994 | Richards | 386/39 |
| 5,303,326 A | * 4/1994 | Dean et al. | 704/201 |
| 5,341,350 A | 8/1994 | Frank et al. | 369/30 |
| 5,428,593 A | 6/1995 | Kanai et al. | 369/59 |
| 5,481,509 A | 1/1996 | Knowles | 369/30 |
| 5,515,352 A | 5/1996 | Iizuka | 369/59 |
| 5,559,779 A | 9/1996 | Iizuka | 369/59 |
| 5,606,466 A | 2/1997 | Fisher et al. | 360/51 |
| 5,633,837 A | * 5/1997 | Gantt | 369/7 |
| 5,680,378 A | 10/1997 | Miyake | 369/48 |
| 6,172,948 B1 | * 1/2001 | Keller et al. | 369/83 |

* cited by examiner

*Primary Examiner*—Ali Neyzari
(74) *Attorney, Agent, or Firm*—John D. Gugliotta; Matthew Shaheen

(57) ABSTRACT

Disclosed is an automotive CD player/receiver with an integrated digital recorder that improves over conventional digital audio playback devices commonly found in automobiles and the like. The present invention improves;over conventional car audio technology by providing an otherwise conventional CD player for automotive use with a built-in magnetic media hard drive of a capacity sufficient to store the music of several CDs. By storing a variety of chosen individual songs or entire CDs on hard drive they are ready for instant playback, eliminating the need to carry several CDs and their cases, while still allowing the users to have their favorite songs at their fingertips.

5 Claims, 1 Drawing Sheet

AUDIO COMPONENT WITH INTEGRATED DIGITAL RECORDING AND STORAGE MEDIA

BACKGROUND OF THE INVENTION

1. Field of the Invention

The present invention relates generally to audio systems, and more specifically to an audio component with an integrated digital recording and storage media.

2. Description of the Related Art

Audio recording and playback for use both in homes and automobiles is a constantly evolving technology wherein new products are being introduced and existing products are being improved upon in order to achieve a high quality sound. Manufacturers of these audio components continually add to the long list of features and functionality of the components in order to set their products above the rest.

The arrival of digital recording and playback technology has revolutionized this industry, combining the fields of sound amplification and acoustics with computer electronics. As a result, a high degree of audio clarity and quality can be achieved at a relatively low cost, incorporating the virtually unending functionality that modern microprocessing electronics offer. As a result of these significant advancements in the field, competition among the producers of this type of equipment is fierce as consumers demand cutting edge technology for their money. One of the products resulting from this customer demand are the CD changers wherein several compact discs are inserted and selectively played over the audio system. In an automobile scenario, typically mounted in the trunk, beneath the seat or in the glove compartment, these systems can be burdensome to use because the user must select the few favorite CD's he or she wishes to use, must access a remote location to access the changer and, depending upon the system, memorize or otherwise record the identity of the particular discs currently in the changer. Furthermore, the user may have a favorite song or track from a CD in which the remaining songs do not suit his or her taste, but nevertheless must include the entire disc if access to that song is desired. Accordingly, there is a need for a means by which an audio system can provide access to both the user's favorite CD's and track selections that is easy to use and access and that eliminates the burdens associated with the use of conventional CD changers. The present invention fulfills this need.

A search of the prior art did not disclose any patents that read directly on the claims of the instant invention. However, several references are directed to digital audio recording means incorporating a variety of storage mediums including hard drives, magnetic tapes, and optical disks and the like. None of these disclosures, however, disclose any incorporation of these devices in a home or automotive audio CD player or audio system and, as such, they neither anticipate nor disclose any embodiment that would negate the novelty of, or make obvious the utilitarian functionality of the present invention.

Several patents disclose digital recording methods and apparatuses used to convert audio signals from analog and digital formats and store them on magnetic media such as hard discs:

U.S. Pat. No. 5,680,378 issued in the name of Miyake;
U.S. Pat. No. 5,606,466 issued in the name of Fisher et. al.;
U.S. Pat. No. 5,559,779 issued in the name of Iizuka; and
U.S. Pat. No. 5,515,352 issued in the name of Iizuka.

All of these disclosures are directed solely to the methods involved in data compression, transfer and conversion required to store an audio signal in a digital format and methods by which to tag individual tracks for identification and location purposes. Although the main feature of these devices is the ability to provide instantaneous selection and access to a variety of digitally recorded tracks, the purpose demonstrated by these disclosures is that of simplifying the procedures involved in editing the audio data, particularly in professional recording applications and environments. None of these disclosures, however, identify or anticipate incorporation of these methods and devices into recording and playback apparatuses intended for consumer level use in either homes or automobiles.

U.S. Pat. No. 5,481,509 issued in the name of Knowles, and U.S. Pat. No. 5,341,350 issued in the name of Frank et. al., disclose audio/visual jukebox type devices that incorporate the use of magnetic mass storage media to store a variety of audio tracks and accompanying video signals for selective playback by the user.

The Knowles patent describes a audio/video jukebox having an interactive touch-screen menu in which the user can select a music video to sing along with karaoke-style. The Frank et al. patent discloses an audio/video jukebox system wherein a centralized storage unit distributes music videos to a variety of remotely located video screen/speaker arrangements. Intended primarily for entertainment purposes at the individual tables of restaurants and the like, the system allows patrons to select the tracks desired to be listened to at individual tables rather than relying on the selections of all of the patrons as a whole as is the case where a single jukebox services the entire location. While these disclosures do describe magnetic media recording for selective playback in a consumer entertainment environment, none of these disclosures identify or anticipate incorporation of these methods and devices into recording and playback apparatuses intended for consumer level use in either homes or automobiles.

U.S. Pat. No. 5,428,593 issued in the name of Kanai et. al. discloses a method and apparatus that incorporated the use of a magnetic hard drive storage device to allow for level adjustments when converting audio signals from one format to another in a recording environment. The disclosure fails to identify or anticipate incorporation of these methods and devices into recording and playback apparatuses intended for consumer level use in either homes or automobiles.

While several features exhibited within these references may be incorporated into this invention, alone and in combination with other elements, the present invention is sufficiently different so as to make it distinguishable over the prior art.

SUMMARY OF THE INVENTION

The present invention consists of an audio system component with an integrated digital recorder and storage media that improves over conventional digital audio playback devices. In the preferred embodiment, the present invention improves over conventional car audio technology by providing an otherwise conventional CD player for automotive use with a built-in magnetic media hard drive of a capacity sufficient to store the music of several CDs. The device includes the same user-friendly interface that is typical of other modern electronic audio components that make it easy for him/her to record the individual songs or CDs of choice. The user simply stores the chosen individual songs or entire CDs on hard drive and they are ready for playback. Use of the present invention eliminates the need to carry several CDs and their cases, while still allowing the users to have their favorite songs at their fingertips. Alternative embodiments of the present invention anticipate the use of such a digital recording and storage media system in a home environment and in various configurations that include totally integrated CD, AM/FM receiver, amplifiers and loudspeakers as well as a stand alone component for use in conjunction with separate audio components.

It is therefore an object of the present invention to provide an audio system component with an integrated digital recorder and storage media in which the use of a magnetic media hard drive allows for customized storage of several digital audio tracks recorded from CDs inserted into the CD player portion of the device.

It is another object of the present invention to provide an audio system component with an integrated digital recorder and storage media in which the use of a magnetic media hard-drive allows for customized storage of several digital audio tracks recorded from receiver portion of the device.

It is another object of the present invention to provide an audio system component with an integrated digital recorder and storage media in which the capacity of the hard drive is equivalent to that of several conventional audio CDs.

It is another object of the present invention to provide an audio system component with an integrated digital recorder and storage media in which the user can program information associated with each track in order to identify the track title, artist, album title, and any other information deemed necessary by the user.

Finally, it is an object of the present invention to provide an audio system component with an integrated digital recorder and storage media in which a variety of features found on conventional CD players, such as random play, repeat and sample modes, are available for the enhancement of user's listening pleasure.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
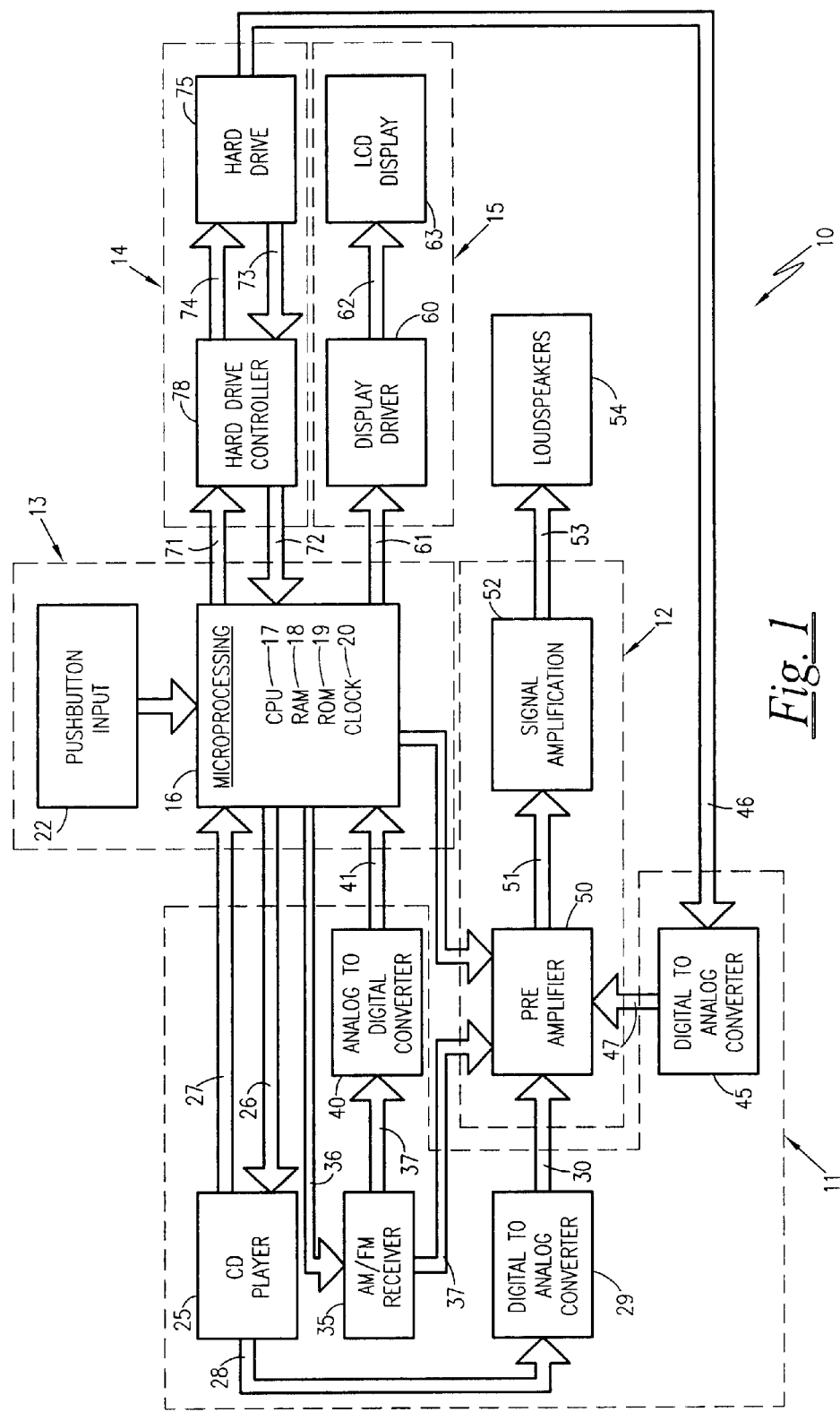
FIG. 1 is a block diagram depicting the major electronic components incorporated into the audio system component with an integrated digital recorder and storage media, according to the preferred embodiment of the present invention.

| LIST OF REFERENCE NUMBERS | |
|---|---|
| 10 | Audio Digital Recorder |
| 11 | CD/receiver Section |
| 12 | Amplification Section |
| 13 | Controller Section |
| 14 | Recorder Section |
| 15 | Display Section |
| 16 | Microprocessor |
| 17 | CPU |
| 18 | RAM |
| 19 | ROM |
| 20 | System Clock |
| 22 | Pushbutton Inputs |
| 25 | CD Player |
| 26 | CD Control Commands |
| 27 | CD Status And Data Feedback |
| 28 | CD Digital Audio Signal |
| 29 | CD Digital To Analog Converter |
| 30 | CD Analog Audio Signal |

| -continued | |
|---|---|
| LIST OF REFERENCE NUMBERS | |
| 35 | AM/FM Receiver |
| 36 | AM/FM Control Commands |
| 37 | AM/FM Analog Audio Signal |
| 40 | AM/FM Analog To Digital Converter |
| 41 | AM/FM Digital Audio Signal |
| 45 | Hard Drive Digital To Analog Converter |
| 46 | Hard Drive Digital Audio Signal |
| 47 | Hard Drive Analog Audio Signal |
| 50 | Pre Amplifier |
| 51 | Conditioned Analog Signal |
| 52 | Amplifier |
| 53 | Amplified Audio Signal |
| 54 | Loudspeakers |
| 60 | Display Driver |
| 61 | Display Signal |
| 62 | LCD Signal |
| 63 | LCD Display |
| 70 | Hard Drive Controller |
| 71 | Data And Control Signals |
| 72 | Data Signals |
| 73 | Read Data |
| 74 | Write Data |
| 75 | Hard Drive |

DESCRIPTION OF THE PREFERRED EMBODIMENTS

1. Detailed Description of the Figures

Referring now to FIG. 1, depicted are the major electronic components incorporated into the audio system component with an integrated digital recorder and storage media, hereinafter audio digital recorder 10, according to the preferred embodiment of the present invention. The audio digital recorder 10 consists generally of a CD/receiver section 11, an amplification section 12, a controller section 13, a recorder section 14 and a display section 15. The preferred embodiment depicts these components in an integrated state contained within a single audio component, although it is envisioned that a separate recording and storage media component for use with individual CD, receiver, and amplification components would be equally desirable. Therefore, the description hereinbelow is meant in no way to preclude such an embodiment.

The controller section 13 consists of a microprocessor 16 that includes a central processing unit, hereinafter CPU 17, random access memory, hereinafter RAM 18, non-volatile read-only memory, hereinafter ROM 19 and a system clock 20. The microprocessor 16 coordinates the operation of the various components in the CD/receiver section 11, amplification section 12, recorder section 14 and display section 15 and controls the flow of data therein between. Source code stored in ROM 19 contains the various commands required to perform the functions requested by the user via pushbutton inputs 22 located on the control panel (not shown) of the audio digital recorder 10. The commands are carried out by the CPU 17 using RAM 18 as a memory buffer in which to temporarily store processing information.

The CD/receiver section 11 is similar in nature to that of CD player and AM/FM receiver combinations widely used in a variety of audio systems. A CD player 25 receives CD control commands 26 from and sends CD status and data feedback 27 to the microprocessor 16. The CD player 25 reads digital audio recordings stored on an audio compact disc (not shown) and sends a CD digital audio signal 28 to a CD digital to analog converter 29. The CD digital to analog converter 29 converts the CD digital audio signal 28 to a CD analog audio signal 30 that is sent to the amplifier section 12. An AM/FM receiver 35 receives AM/FM control commands 36 from the microprocessor 16. The AM/FM receiver 35 sends an AM/FM analog audio signal 37 to the amplifier section 12. Unlike conventional systems, however, the CD/receiver section 11 includes an AM/FM analog to digital converter 40 that converts the AM/FM analog audio signal 37 to an AM/FM digital audio signal 41 that is sent to the microprocessor 16. Finally, a hard drive digital to analog converter 45 receives a hard drive digital audio signal 46 from the digital recorder section 14 and converts it to an hard drive analog audio signal 47 that is sent to the amplifier section 12.

The amplifier section 12 consists of a pre amplifier 50 that accepts the CD analog audio signal 30, AM/FM analog audio signal 37 and hard drive analog audio signal 47, applies signal conditioning in terms of bass, midrange, treble, balance and volume, as defined by the user via the pushbutton inputs 22 as interpreted by the microprocessor 13. The pre amplifier 50 sends a conditioned analog signal 51 to an amplifier 52 that amplifies the conditioned analog audio signal 51, creating an amplified audio signal 53 that is sent to the loudspeakers 54.

The display section 15 consists of a display driver 60 that accepts a display signal 61 from the microprocessor 16 and converts it into an LCD signal 62 that drives the LCD display 63 located on the control panel (not shown). The display. section 15 is used to display information pertaining to the status of the audio digital recorder 10 including, but not limited to information such as CD track number, track time, radio stations, sound conditioning settings, recording information, etc.

The recorder section 14 includes a hard drive controller 70 that receives data and control signals 71 from and sends data signals 72 to the microprocessor 16. The hard drive controller 70 interprets the hard drive control commands and data signals 71, retrieving read data 73 from and submitting write data 74 to a hard drive 75. In the preferred embodiment, the hard drive 75 consists of a magnetic media storage device, such as those used in personal computers, although a variety of storage media are equally suited. Incorporation of the recorder section 14 allows the user to record a number of CD track selections or entire CD's locally on the hard drive 75 for instantaneous playback, thus eliminating the need to constantly change CDs or purchase a separate CD changer. As conventional media storage devices are of a large capacity and knowing that a typical CD has a capacity of just over 1 billion bytes (1 gigabyte), depending on the data format and compression algorithms, hard drives of an 8–12 gigabyte capacity would be capable of storing in upwards of hundreds of song tracks of an average length.

2. Operation of the Preferred Embodiment

In accordance with the preferred embodiment of the present invention and as shown in FIG. 1, the audio digital recorder 10 functions similarly to conventional audio systems, especially those commonly found in automobiles, sin that CDs can be played via the CD player 25 and broadcast radio station signals can be played via the AM/FM receiver 35. The automotive digital recorder 10, however, incorporates the additional feature of local digital recording capabilities wherein the microprocessor 16 controls the flow of digital audio data CD/receiver section 11 to the digital recording section 14, directing the digital audio signal portion of the CD status and data feedback 27 and the AM/FM digital audio signal 41 to the hard drive controller 70 and hard drive 75 to be stored for future retrieval and listening. When recording a CD, the user has the option of performing amass data transfer wherein the entire CD or selected tracks thereon are transferred rapidly from the CD player to the hard drive 75, without listening to the audio signal. The user can also record the CD as it is played by the CD player 25. The availability of the storage space on the hard drive 75 allows the user to tag track selections with personalized identification information pertaining to artists, song titles, album titles, etc. by entering information via the pushbutton inputs 22. Thus, the information will be displayed on the LCD display 63 during playback in order to help further identify the selected tracks. Music recorded from the AM/FM receiver 35 obviously contains no pre-defined track information as do the tracks on a CD. As a result, the length of a track recorded from the AM/FM receiver 35 is user defined as the time between when recording is begun to when it is ended, and therefore can be of an extended length. The user does have the option of tagging a track recorded from the AM/FM receiver 35 with the same type of identifying indicia as that of a recorded CD track.

During playback of the tracks stored on the hard drive 75, as described earlier, a hard drive digital audio signal 46 is sent to the hard drive digital to analog converter 45, then on to the amplifier section 12 where it is conditioned and amplified to a level sufficient to drive a set of loudspeakers 54. The user defined track information is read by the microprocessor 16, sent to the display driver 62 and displayed on the LCD display 63.

While the -preferred embodiments of the invention have been shown, illustrated, and described, it will be apparent to those skilled in this field that various modifications may be made in these embodiments without departing from the spirit of the present invention. For example, while magnetic media hard drives are described in the preferred embodiment, it is realized that alternative storage mediums such as optical storage means may be available and, perhaps, better suited for incorporation in the present invention. It is for this reason that the scope of the invention is set forth in and is to be limited only by the following claims.

What is claimed is:

1. An audio component-with an integrated digital recording and storage media, said audio component comprising:

means for receiving an input audio signal generated by a stereo system audio component wherein an analog to digital conversion means receives an input analog audio signal and converts said input analog audio signal to a digital audio signal;

digital storage means for recording and storing said digital audio signal, said digital storage means being capacious with re-write capabilities and being permanent in nature, wherein said digital storage means further comprises a magnetic media hard drive having a capacity of at least five gigabytes, a controller having a microprocessor in combination with both random access memory means and non-volatile read-only memory means, said controller performing a variety of pre-programmed routines and controlling the storage and retrieval of the recorded digital audio signals stored on said storage means;

user interface means whereby one can monitor and manipulate the operation of said controller; and digital to analog conversion means wherein the said recorded digital audio signals are converted to an output analog audio signal capable of amplification by audio components whereby said output analog audio signals are broadcast via loudspeakers; wherein said audio component is used on combination with stereo equipment to allow for the selective recording and playback of a combination of audio tracks.

2. An audio component with an integrated digital recording and storage media, said audio component comprising:

means for receiving an input audio signal generated by a stereo system audio component wherein an analog to digital conversion means receives an input analog audio signal and converts said input analog audio signal to a digital audio signal;

digital storage means for recording and storing said digital audio signal, said digital storage means being capacious with re-write capabilities and being permanent in nature;

a controller having a microprocessor in combination with both random access memory means and non-volatile read-only memory means, said controller performing a variety of pre-programmed routines and controlling the storage and retrieval of the recorded digital audio signals stored on said storage means;

user interface means whereby one can monitor and manipulate the operation of said controller; and digital to analog conversion means wherein the said recorded digital audio signals are converted to an output analog audio signal capable of amplification by audio components whereby said output analog audio signals are broadcast via loudspeakers; wherein said audio component is used on combination with stereo equipment to allow for the selective recording and playback of a combination of audio tracks, wherein said audio component is of an integrated design, incorporated into the design of an AM/FM receiver and CD player for automotive use.

3. The audio component of claim 2, wherein said digital storage means further comprises an optical storage device.

4. The audio component of claim 2, wherein said digital storage means further comprises a magnetic media hard drives.

5. The audio component of claim 4, wherein said magnetic media hard drive has a capacity of at least five gigabytes.

* * * * *